(12) United States Patent
Hinnen et al.

(10) Patent No.: US 10,459,216 B1
(45) Date of Patent: Oct. 29, 2019

(54) SUPPORT PLATE WITH LAYER ABSORBENT TO LIGHT

(71) Applicant: Amazon Technologies, Inc., Seattle, WA (US)

(72) Inventors: Karel Johannes Gerhardus Hinnen, Eindhoven (NL); Tulasi Sridhar Reddy Guntaka, Tilburg (NL); Abhishek Kumar, Waalre (NL); Toru Sakai, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/463,686

(22) Filed: Mar. 20, 2017

(51) Int. Cl.
*G02B 26/00* (2006.01)
*G02B 5/22* (2006.01)
*G02B 5/08* (2006.01)

(52) U.S. Cl.
CPC ............ *G02B 26/005* (2013.01); *G02B 5/08* (2013.01); *G02B 5/22* (2013.01); *G02B 2207/115* (2013.01)

(58) Field of Classification Search
CPC .... G02B 26/005; G02B 26/02; G02B 26/004; G02B 26/007; G02B 5/201; G02B 26/04; G02B 2207/115; G02B 26/00; G02B 1/04; G02B 1/06; G02B 26/023; G02B 26/0841; G02B 27/0172; G02B 27/4233; G02B 5/003; G02B 5/0236; G02B 5/0273; G02B 5/0278
USPC ........ 359/237, 242, 265–267, 290–292, 295, 359/296, 298
See application file for complete search history.

(56) References Cited

U.S. PATENT DOCUMENTS

| | | | |
|---|---|---|---|
| 9,500,852 B1 * | 11/2016 | Tauk .................... | G02B 26/005 |
| 9,529,189 B1 * | 12/2016 | Langendijk .......... | G02B 26/005 |
| 2007/0217021 A1 * | 9/2007 | Hendriks ................ | G02B 3/14 |
| | | | 359/666 |
| 2011/0194168 A1 * | 8/2011 | Slack .................... | G02B 26/005 |
| | | | 359/290 |

* cited by examiner

*Primary Examiner* — Brandi N Thomas
(74) *Attorney, Agent, or Firm* — EIP US LLP

(57) ABSTRACT

An electrowetting element comprises a wall transmissive to light of a first wavelength. A support plate comprises an electrode and a layer absorbent to light of the first wavelength, which for example has passed into the support plate through the wall.

20 Claims, 9 Drawing Sheets

SUPPORT PLATE WITH LAYER ABSORBENT TO LIGHT

BACKGROUND

In a known electrowetting element, walls surround a display area and at least partly confine an oil based liquid from overspilling into an adjacent electrowetting element. Such a wall is formed of a material transmissive to visible light. Metallic parts underlying the wall may therefore reflect light, having passed through the wall, back out through the wall and towards a viewer. This can negatively affect the contrast of an image displayed by an array of such electrowetting elements. Accordingly, it is desirable to improve the contrast performance of an electrowetting element.

SUMMARY

An electrowetting element is provided. The electrowetting element includes a first support plate comprising an electrode and a first layer absorbent to light of a first wavelength. The electrowetting element includes a second support plate, a first fluid in contact with the first support plate, a second fluid immiscible with the first fluid and in contact with the second support plate, the first fluid and the second fluid located between the first support plate and the second support plate, and a wall which at least partly surrounds an area of the first support plate in contact with the first fluid, the wall transmissive to light of the first wavelength.

Another electrowetting element is provided. The electrowetting element includes a first support plate comprising a wall transmissive to light of at least one wavelength within the visible spectrum, a hydrophobic layer, the wall in contact with the hydrophobic layer, a reflective electrode for reflection of light towards the hydrophobic layer, a first layer absorbent to light of the at least one wavelength within the visible spectrum, and an electrical conductor, a portion of the electrical conductor overlapped by at least a portion of the wall and having a reflective surface angled to receive light of the at least one wavelength within the visible spectrum from the wall and redirect the light towards the first layer. The electrowetting element includes a second support plate, a first fluid in contact with the hydrophobic layer, and a second fluid immiscible with the first fluid and in contact with the second support plate, the first fluid and the second fluid located between the first support plate and the second support plate.

An apparatus is provided. The apparatus includes an electrowetting element including a first support plate. The first support plate includes an electrode, and a first layer absorbent to light of a first wavelength. The electrowetting element includes a second support plate, a first fluid in contact with the first support plate, a second fluid immiscible with the first fluid and in contact with the second support plate, the first fluid and the second fluid located between the first support plate and the second support plate, and a wall which at least partly surrounds an area of the first support plate in contact with the first fluid, the wall transmissive to light of a first wavelength. The apparatus includes at least one processor and at least one memory comprising computer program instructions, the at least one memory and the computer program instructions operable to, with the at least one processor, control operation of the electrowetting element.

DETAILED DESCRIPTION

Examples are described herein of an electrowetting element with an absorbent layer in a support plate. The absorbent layer, otherwise referred to herein as a first layer, for example absorbs light in the visible spectrum which has undesirably entered the support plate via a wall. With appropriate configuration of the absorbent layer, for example position, size and/or shape, reflection of the undesirable light within the support plate can be reduced or prevented. In some examples, a light redirector (such as a reflector) is used to redirect the undesired light towards the absorbent layer. Such a light redirector in some examples is an electrical conductor (such as a source or gate line) with reflective surfaces for redirecting the light. Such examples reduce the chances of reflection of such undesirable light by a metallic part in the support plate back out of the support plate, via the wall, which can have a negative effect on the contrast of an image displayed by Examples are described below. Firstly, features of an electrowetting element and circuitry for controlling the electrowetting element will be described. Then, the problem of undesired reflection will be explained, followed by various examples with an absorbent layer in the support plate to address the problem. Finally, apparatus is described which may include such an electrowetting element, for example an e-reader.

Figure 1:
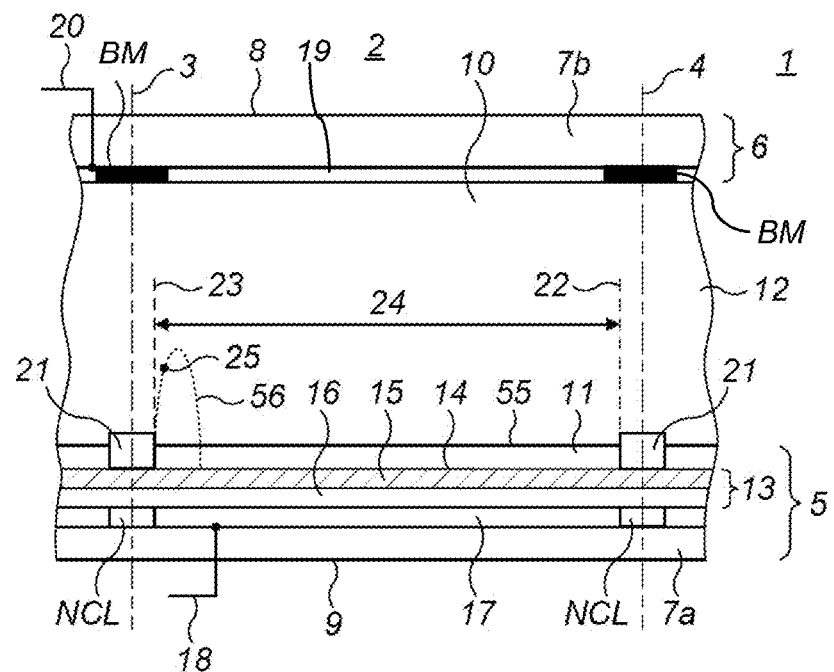
FIG. 1 shows schematically a cross-section of a part of an example electrowetting display device.

FIG. 1 shows a diagrammatic cross-section of part of an example of an electrowetting display device 1, which may be incorporated in the apparatus 99 described later with FIG. 11.

FIG. 1 is schematic in nature; the electrowetting display device 1 illustrated may in examples include further features not illustrated in FIG. 1. For example, the electrowetting display device 1 may include circuitry such as that of any of FIGS. 3 to 6. The electrowetting display device 1 may be referred to as a display device and includes a plurality of electrowetting elements 2 which are for example arranged in an array or matrix of n rows and m columns, where each of n and m are integers. Such electrowetting elements may otherwise be considered as display elements or picture elements, each configurable to provide a display effect which together form an image displayed by display device. An electrowetting element may in some examples be considered a pixel and in other examples a sub-pixel.

The lateral extent of the electrowetting element 2 is indicated in the Figure by two dashed lines 3, 4. The electrowetting elements comprise a first support plate and a second support plate such as the first support plate 5 and the second support plate 6 referred to with reference to FIG. 1, which also form part of the electrowetting display device 1. The support plates may be separate parts of each electrowetting element, but the support plates may instead be shared in common by the plurality of electrowetting elements. The support plates may each include a glass or polymer substrate 7a, 7b and may be rigid or flexible. The substrate may otherwise be considered a support layer or substrate layer and is for example located at an underside of the first support plate. The absorbent layer may cover, for example lie across and in contact with, a surface of the substrate layer. The second support plate as shown in FIG. 1 may have a grid or matrix shaped layer of light absorbing material. For example, the material may absorb substantially all light in the visible spectrum, for example in the range of about 390 to about 700 nanometers, and hence appears black. Such a structure may be referred to as a black matrix BM and at least partly overlaps walls 21 described below. A black matrix BM is used for example to improve contrast for each electrowetting element, for example by blocking light which may enter through a wall, then be reflected out through the walls 21 towards a viewer.

The display device has a viewing side 8 on which an image or display effect formed by the display device can be viewed and a rear side 9. In the Figure a side of the first support plate 5 corresponds with the rear side 9; a side of the second support plate 6 corresponds with the viewing side 8; alternatively, in other examples, a side of the first support plate may correspond with the viewing side. The display device may be of the reflective type. The display device may be an active matrix driven display device. The plurality of electrowetting elements may be monochrome. For a color display device the electrowetting elements may be divided in groups, each group having a different color; alternatively, an individual electrowetting element may be able to show different colors.

The second support plate 6 is positioned such that a first fluid 11 and a second fluid 12 are located between the first support plate 5 and the second support plate 6, in the space 10. The second fluid contacts the second support plate. In the example of FIG. 1, each electrowetting element 2 includes a respective portion of the first fluid 11 and the second fluid is shared by the array of electrowetting elements. However, in other examples, each electrowetting element may include a portion of the second fluid, for example where the second fluid is not shared by the array of electrowetting elements. At least one of the first and second fluids may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which corresponds with a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of the first fluid is not mixed with the majority of the volume of the second fluid.

The second fluid is electrically conductive or polar and may be water, or a salt solution such as a solution of potassium chloride in water. In examples, the second fluid is polar and in some examples is electrically conductive, but in other examples is not electrically conductive. The second fluid may be transparent. The first fluid is typically electrically non-conductive and may for instance be an alkane like hexadecane or may be an oil such as silicone oil. The first fluid is therefore non-polar in at least some examples.

The first fluid may absorb at least a part of the optical spectrum. The first fluid may be transmissive for a part of the optical spectrum, forming a color filter. For this purpose the first fluid may be colored by addition of pigment particles or a dye. Alternatively, the first fluid may be black, for example absorb substantially all parts of the visible spectrum, or reflecting. A reflective first fluid may reflect the entire visible spectrum, making the layer appear white, or part of it, making it have a color. In some examples, the first fluid is black and therefore absorbs substantially all parts of the optical spectrum, for example in the visible light spectrum. In other examples, the first fluid is another color than black and absorbs another part of the optical spectrum, for example a sub-range of wavelengths within the visible spectrum. In other examples, the display device includes electrowetting elements having first fluids which are respectively red, green or blue, or cyan, magenta and yellow to provide a full color display. Typically, by absorbing substantially all parts of the optical spectrum, there is nonetheless a degree of variation. Therefore, the first fluid may not absorb all wavelengths, but the majority of wavelengths within a given spectrum such as the visible spectrum, so as to perform the function of the first fluid in the electrowetting element. The first fluid may therefore be configured to absorb substantially all light incident on the first fluid. For example the first fluid may absorb 90% or more of light in the visible spectrum and incident on the first fluid.

The first support plate 5 includes an insulating layer 13. The insulating layer may be transparent or reflective. The insulating layer 13 may extend between walls 21 of an electrowetting element 2. To avoid short circuits between the second fluid 12 and electrodes arranged under the insulating layer, layers of the insulating layer may extend uninterrupted over a plurality of electrowetting elements 2, as shown in the Figure. The insulating layer has a surface 14 facing the space 10 of the electrowetting element 2. In this example the surface 14 is hydrophobic. The thickness of the insulating layer may be less than 2 micrometers and may be less than 1 micrometer. The surface is in contact with at least one of the first fluid or the second fluid, depending on the fluid configuration as described below. Hence, the first support plate is in contact with the first fluid.

The insulating layer may be a hydrophobic layer; alternatively, it may include a hydrophobic layer 15 and a further layer, such as a dielectric layer 16, with predetermined dielectric properties, the hydrophobic layer 15 facing the space 10, as shown in the Figure. The hydrophobic layer is schematically illustrated in FIG. 1 and may be formed of Teflon® AF1600. The dielectric layer 16 may have a thickness, taken in a direction perpendicular to the plane of the substrate, of between 5 nanometers and several micrometers, for example between 50 nanometers and 2 or 3 micrometers. In other examples the thickness may be between 50 nanometers and 500 nanometers. The dielectric layer may be made of an inorganic material like silicon oxide or silicon nitride.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each electrowetting element 2 includes an electrode 17, referred to herein also as a first electrode, as part of the first support plate 5. In examples shown there is one such electrode 17 per electrowetting element, although in other examples some or all electrowetting elements may have more than one electrode. The electrode 17 is electrically insulated from the first and second fluids by the insulating layer 13; electrodes of neighboring electrowetting elements are separated by an electrically non-conductive layer NCL. In some examples, further layers may be arranged between the insulating layer 13 and the electrode 17. The electrode 17 can be of any desired shape or form, and may be made of the transparent or light transmissive electrically conductive material indium tin oxide (ITO). The electrode 17 of an electrowetting element is supplied with voltage signals by a signal line 18, schematically indicated in the Figure. At least a surface of the electrode 17 nearest the first fluid may be reflective, to implement a reflective type of electrowetting element by reflection of light towards the hydrophobic layer, in contrast to a transmissive type of electrowetting element.

A second signal line 20 is connected to a second electrode 19 that is in electrical contact with the conductive second fluid 12. The second electrode 19 may be made of ITO. The second electrode may be common to all elements, for example when they are fluidly interconnected by and share the second fluid, uninterrupted by walls. The electrowetting element 2 can be controlled by a voltage V applied between the signal lines 18 and 20 and hence between the first electrode 17 and the second electrode 19, which is therefore a voltage applied to the electrowetting element. The electrowetting element electrodes on the substrate 7a are coupled to a display driving system, described further below. In a display device having the electrowetting elements arranged in a matrix form, the first electrodes can be coupled to a matrix of control lines on the substrate 7a using the signal line 18. The signal line 20 may be coupled to a display driving system.

It is to be noted that walls 21 are referred to, with for example one such wall corresponding to a wall along one side of the display area. Hence, it may be considered that for one electrowetting element there are four walls. It is however envisaged that such walls could instead be referred to as one wall of the electrowetting element which corresponds with a perimeter of the display area.

The first fluid 11 in this example is at least partly confined to an electrowetting element by walls 21 that follow the cross-section of the electrowetting element. The extent of the electrowetting element, indicated by the dashed lines 3 and 4, is taken between the center of the walls. The area of the surface 14 between the walls of an electrowetting element, indicated by the dashed lines 22 and 23, is called the display area 24, over which a display effect occurs. The display effect depends on an extent that the first fluid and the second fluid adjoin the surface corresponding with the display area, in dependence on the magnitude of the applied voltage V described above. The magnitude of the applied voltage V therefore determines the configuration of the first and second fluids within the electrowetting element. In other words, the display effect depends on the configuration of the first and second fluid in the electrowetting element, which configuration depends on the magnitude of the voltage applied between the electrodes of the electrowetting element. For example, for controlling the configuration of the first and second fluids, a specified potential, for example a constant or varying potential, may be applied to the second electrode in contact with the conductive second fluid 12 and the magnitude of a potential applied to the electrowetting element electrode 17 on the substrate 7a may be controlled. The display effect gives rise to a display state of the electrowetting element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively. Thus, the display effect may in effect be controlled by controlling a configuration of the first fluid (and consequently the second fluid).

The first fluid 11 adjoins at least part of the display area 24. A size of the part of the display area adjoined by the first fluid depends on a voltage applied between the electrodes of the electrowetting element. In examples described herein, when a zero or substantially zero voltage is applied between the electrodes, for example when the electrowetting element is in an off state, the first fluid 11 forms a layer between the walls, as shown in FIG. 1 with the reference numeral 55. Hence, a wall at least partly surrounds an area of the first support plate in contact with the first fluid, the area for example being the display area. Typically, substantially zero in examples refers to a voltage which is minimal, for example as close to zero that the first fluid adjoins a maximum extent of the display area 24. Application of a voltage will retract the first fluid, for example against a wall as shown by the dashed shape 56 in FIG. 1. The controllable shape of the first fluid, in dependence on the magnitude of applied voltage, is used to operate the electrowetting element as a light valve, providing a display effect over the display area 24. For example, switching the fluids to increase adjoinment of the second fluid 12 with the display area 24 may increase the brightness of the display effect provided by the element.

This display effect determines the display state of the electrowetting element which an observer will see when looking towards the viewing side of the display device. The display device is capable of providing display states from black to white, including various intermediate grey states; in a color display device, the display state may also include color.

Figure 2:
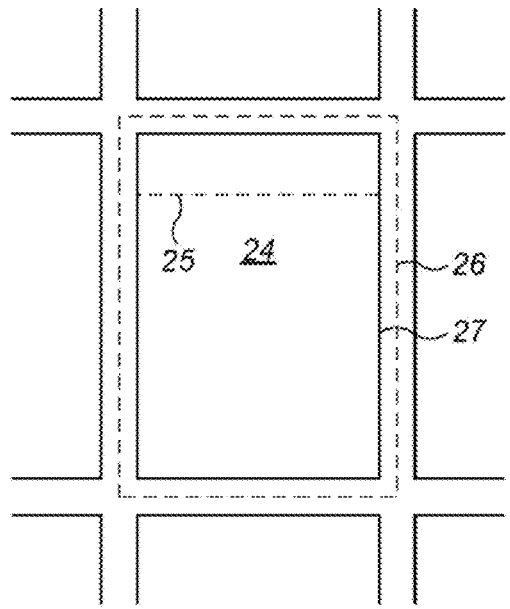
FIG. 2 shows schematically a plan view of the part of the example electrowetting display device of FIG. 2.

FIG. 2 shows a plan view of the electrowetting element of FIG. 1. The lateral dimension of the central electrowetting element in FIG. 2, corresponding to the dashed lines 3 and 4 of the electrowetting element 2 in FIG. 1, is indicated by the dashed line 26. Line 27 indicates the inner border of a wall; the line is also the edge, for example a perimeter, of the display area 24. The dashed line 25 marks the boundary between the first fluid 11 and the second fluid 12 when a voltage is applied to the electrowetting element 2 to retract the first fluid 11 against the wall 21 such that the first fluid 11 has the dashed shape 56.

Figure 3:
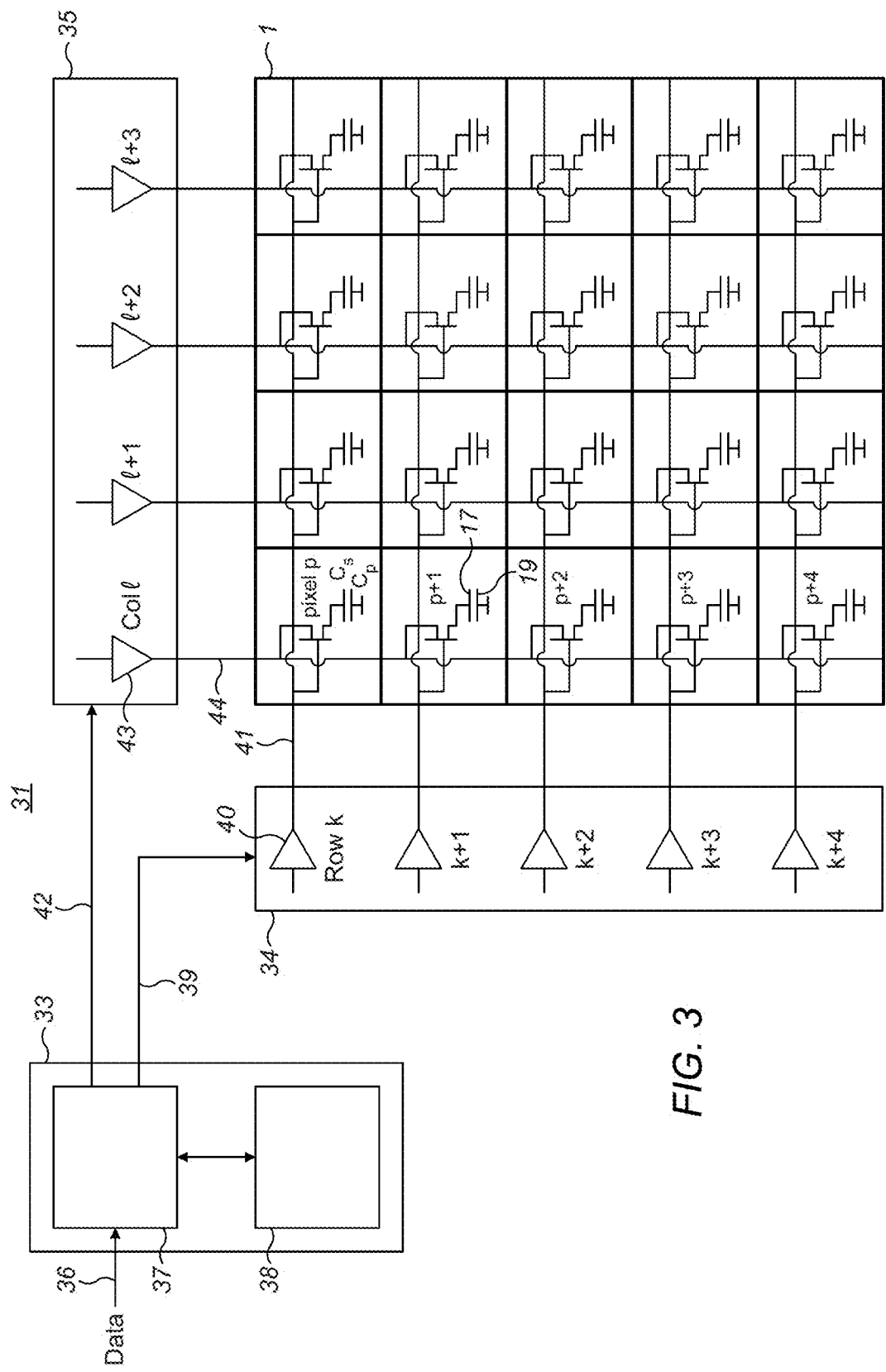
FIG. 3 shows schematically circuitry associated with the example electrowetting display device of FIG. 1.

FIG. 3 shows schematically circuitry associated with the display device described above with FIGS. 1 and 2. A display driving system is for example part of a display device control subsystem described later and in this example includes a display controller or controller 33, a display row driver 34 and a display column driver 35. Data indicative of display states of the electrowetting elements, the display states for example representing a still image or video images, is received from an input line 36 to the display driving system. The display controller includes at least one processor 37 for processing the data entered on the input line 36. The processor is connected to at least one memory 38. The display controller prepares the data for use in the display device.

The at least one memory may store computer program instructions that are configured to cause the display apparatus to perform one or more of the methods of controlling a display device as described when being executed by the processor. The computer program instructions may be stored on a computer program product including a non-transitory computer-readable storage medium. Details of the at least one processor and the at least one memory are described further below with reference to FIG. 11.

An output of the processor 37 is connected by line 39 to the display row driver 34, which includes row driver stages 40 that transform signals to the appropriate voltages for the display device 1. Row lines 41 connect the row driver stages to respective rows of the display device 1 for transmitting the voltage pulses generated in the display row driver to electrowetting elements in each row of the display device, thereby providing a row addressing signal to each row of the display device. In other words, one or more voltage pulses for addressing one or more rows is transmitted over the row lines 41 corresponding to the rows to switching elements corresponding respectively to the electrowetting elements in the one or more rows. The display row driver 34 generates the voltage pulses used for addressing the rows of the display device, using information from the processor 37 to set a value of the pulse duration of the voltage pulses.

Another output of the processor 37 is connected by line 42 to the display column driver 35, which includes column driver stages 43 that transform signals to the appropriate voltages for the display device 1. Column lines 44 connect the column driver stages to the columns of the display device 1, providing a column signal to each column of the display device.

The display controller 33 determines which rows are selected for addressing and in which order. The selected rows are consecutively addressed by applying an addressing signal to each of these rows. The addressing may include the steps of determining a value for a first pulse duration corresponding to at least one voltage pulse to be applied to a row of electrowetting elements, generating the at least one voltage pulse having the first pulse duration and transmitting the at least one voltage pulse to the rows to be addressed. In examples where the electrowetting elements of a row are connected to the same row line, addressing a row for example refers to addressing one or more, for example each, electrowetting element of that row. When an electrowetting element is being addressed, the electrowetting element admits the column signal that is applied to the column line to which the electrowetting element is connected. The column signal for an electrowetting element is applied substantially simultaneously with the voltage pulse used for addressing the electrowetting element. The column signal may be considered to be applied substantially simultaneously with the voltage pulse for example where the column signal is present on the column line for at least the pulse duration of the voltage pulse.

In other examples, a column addressing signal may be applied to one or more, for example, each column of the display device to admit a signal level of a row signal to the electrowetting element electrode. In other words, the functions of the display row driver and display column driver may be swapped, with the display column driver used to generate a voltage pulse for addressing columns of the display device, for example to switch a transistor of each of the electrowetting elements of the column to a conducting state to pass the signal level of the display row driver to the electrowetting element electrode to set the corresponding electrowetting element in a desired display state.

The display drivers may comprise a distributor, not shown in FIG. 3, for distributing data input to the display driver over a plurality of outputs connected to the driver stages. The distributor may be a shift register. FIG. 3 shows the lines only for those columns and rows of the display device that are shown in the Figure. The display row drivers may be integrated in a single integrated circuit. Similarly, the display column drivers may be integrated in a single integrated circuit. The integrated circuit may include the complete driver assembly. The integrated circuit in examples, such as that of FIG. 3, is integrated on the first support plate, although in other examples the integrated circuit may be integrated on the second support plate instead. The integrated circuit may include the entire display driving system. Such an arrangement may be known as a "chip on glass" (COG) construction. In other examples a "chip on foil" (COF) construction may be used, where the display column drivers and/or display row drivers may be integrated on a foil, which is then arranged on the first or second support plate, which foil is connectable to circuit lines of the first or second support plate for driving the picture elements. The integrated circuit may include part or the entire display device control subsystem.

The display device 1 comprises a plurality of electrowetting elements arranged in a matrix or array of n rows, where n may be ≥2, for example larger than one. The matrix may have an active matrix configuration. The matrix may have m columns, where m may be ≥2; the total number of electrowetting elements in this example is n×m. FIG. 3 shows electrowetting elements for five rows, labelled k to k+4 and four columns labelled l to l+3. The total number of rows and columns for common display devices may range between a few hundred and a few thousand. The electrowetting elements of column 1 are labelled p to p+4. Each electrowetting element may have the same construction as the electrowetting element 2 in FIG. 1.

As noted above, FIG. 3 shows a few electrical parts of the electrowetting elements. Each electrowetting element of the display device 1 includes an active element in the form of one or more switching elements. The switching element of an electrowetting element is not necessarily located within the lateral extent of the electrowetting element (for example between the dashed lines 3, 4 as shown in FIG. 1), although it may be. The switching element may be a transistor, for example a thin-film transistor (TFT), or a diode. The electrodes of the electrowetting element are indicated as an electrowetting element capacitor Cp formed by the first electrode 17 and the second electrode 19. The first electrode 17 may be considered to correspond to a first plate of the electrowetting element capacitor Cp and the second electrode 19 may be considered to correspond to a second plate of the electrowetting element capacitor Cp. A line connecting the second electrode 19 of the electrowetting element capacitor Cp to a common potential, in this example ground, is a common signal line 20. A line connecting the first electrode 17 of the electrowetting element capacitor Cp to the transistor is the signal line 18 shown in FIG. 1. The electrowetting element may include a storage capacitor Cs for storage purposes or for making the duration of the holding state or the voltage applied to the element uniform across the display device. The storage capacitor Cs is arranged in parallel with Cp and is not separately shown in FIG. 3. A first plate of the storage capacitor Cs may be connected to a storage control line to which a potential Vstorage is applied and a second plate of the storage capacitor Cs may be connected to the switching element connected to the first electrode 17 of the electrowetting element capacitor Cp. For example both the first electrode 17 of the electrowetting element capacitor Cp and the second plate of the storage capacitor Cs may be connected to a drain of a TFT.

As explained above, in examples, the display column driver 35 provides the signal levels corresponding to the input data for the electrowetting elements. The display row driver 34 provides the signals for addressing the row of which the electrowetting elements are to be set in a specific display state. In examples, addressing a row for example refers to applying a signal on the signal line of the row that switches a transistor of each of the electrowetting elements of the row to a conducting state of the transistor. Each row of the n rows of the display device is addressable by a signal such as a voltage pulse; the voltage pulse is applied to a switching element of each of the electrowetting elements in the addressed row for switching the switching element.

The addressing of rows is part of the addressing of electrowetting elements in an active matrix display device. A specific electrowetting element is addressed by applying a potential to the column in which the specific electrowetting element is located and applying a voltage pulse to the row in which the specific electrowetting element is located.

When the transistor of an electrowetting element receives at its gate a voltage pulse of its row addressing signal, the transistor becomes conducting and it passes the signal level of its display column driver to the first electrode 17 of the electrowetting element, and to the second plate of the storage capacitor Cs in examples with a storage capacitor Cs. In examples, a voltage pulse is a rapid, transient change in potential from a baseline value to a higher or lower value, followed by a rapid return or change to the baseline value. The time period between the two subsequent voltage changes of the voltage pulse is for example termed a pulse duration. After the transistor has been switched off, so the transistor is no longer conducting, the voltage over the electrowetting element will be substantially maintained until the transistor is switched on again by the next row addressing signal for the electrowetting element. The time during which the transistor is switched off may be referred to in examples as the holding state of the element. In this active matrix driving method the first electrodes of the electrowetting elements are connected to the driver stages briefly at the start of a period during which they show a certain display effect. During this connection, a voltage related to the desired display effect is applied between the first and the second electrode. After the electrowetting element is disconnected from the driver stage, the voltage between the first electrode and the second electrode is substantially maintained by one or more capacitors during the period during which the electrowetting element shows the display effect, for example by the electrowetting element capacitor Cp and by the storage capacitor Cs. The period during which the voltage is substantially maintained is determined in these examples by the combined capacitance and leakage currents of the two capacitors Cp, Cs. By using a storage capacitor Cs as well as the electrowetting element capacitor Cp, the voltage may be substantially maintained for a longer duration than otherwise, although in other examples the electrowetting element need not include a storage capacitor Cs. A voltage may be considered to be substantially maintained for example where a change in the voltage is sufficiently small that it does not cause a visible change in a display state of an electrowetting element. For example, a change in display effect, for example transmission or reflectance, of less than 10% is typically not visible to a viewer. The method is called 'active', because the electrowetting element contains at least one active element, for example a transistor.

Figure 4:
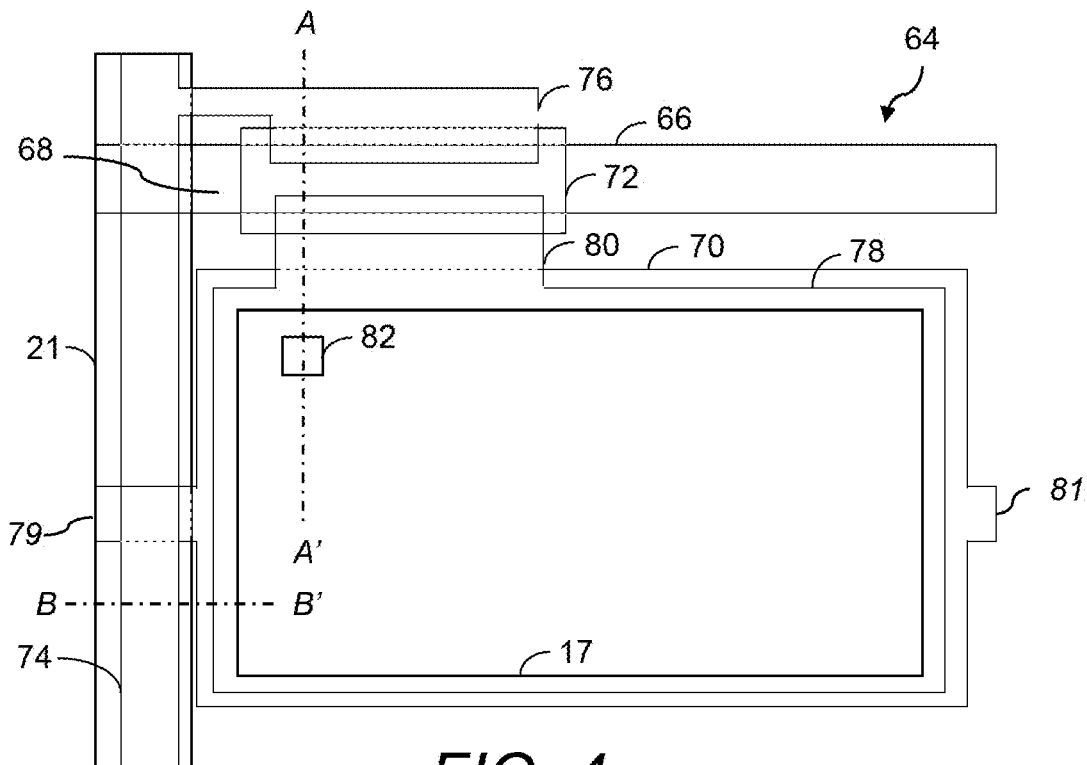
FIG. 4 shows schematically part of an example electrowetting element in plan view.
Figure 5:
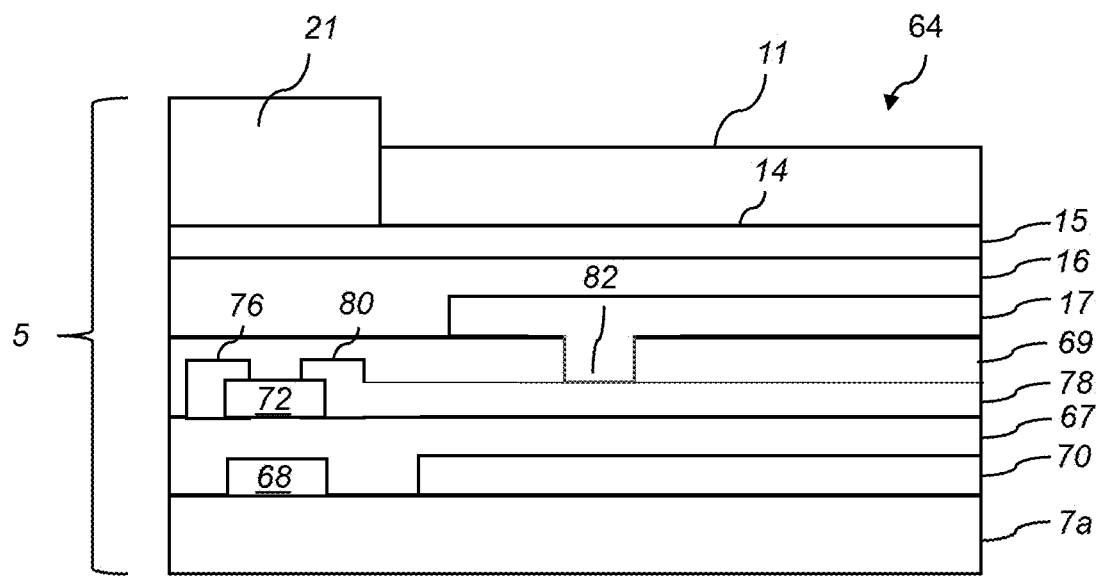
FIG. 5 shows schematically a cross-section of part of the example electrowetting element of FIG. 4 along the line A-A' of FIG. 4.

FIGS. 4 and 5 show a schematic example of a first electrowetting element 64 such as that of FIGS. 1 and 2. FIG. 4 shows the example first electrowetting element 64 schematically in plan view and FIG. 5 shows schematically a cross-section of part of the first electrowetting element 64 of FIG. 4 along the line A-A' of FIG. 4. The first electrowetting element 64 of FIGS. 4 and 5 is similar to the electrowetting element 2 of FIG. 1 but with circuitry illustrated in greater detail and other features not shown for clarity. Features of FIGS. 4 and 5 similar to FIG. 1 are labelled with the same reference numerals; corresponding descriptions apply. It is to be appreciated that a dashed line indicates a structure lying below the plane of the drawing. The first electrowetting element 64 in examples is an electrowetting element of an array of electrowetting elements arranged as a matrix of n rows and m columns, for example as described above. The array of electrowetting elements typically has a plurality of row lines and a plurality of column lines, such as the row and column lines described above with reference to FIG. 3. Each row line of the plurality of row lines passes through electrowetting elements of a respective row of the n rows and each column line of the plurality of column lines passes through electrowetting elements of a respective column of the m columns. For example, each row line may be a gate line or connector for connection to the gate of a TFT or to a diode and each column line may be a source line or connector for connection to the source of a TFT or to a diode. Any of the row and column lines may for example be formed as a strip of metal, for example having an elongate and flattened form, e.g. a form which is relatively thin in thickness compared with a length and width dimension. Although as will be explained later, other forms are envisaged to for example redirect light. A form of any of the row and column lines may follow at least part of perimeter of an electrowetting element of the array of electrowetting elements, which may have any shape of a polygon.

In the example of FIGS. 4 and 5, a row line 66 passes through the first electrowetting element 64. The row line 66 is for example located on a surface of the substrate 7a of the first support plate 5, although in examples there may be one or more layers between the row line 66 and the substrate 7a. The row line 66 in the example of FIGS. 4 and 5 comprises a portion that is considered to act as a gate terminal 68 of a thin film transistor. There is an electrically conductive plate 70 in the same layer as the row line 66 in the example of FIGS. 4 and 5. The electrically conductive plate 70 functions as a lower plate of a storage capacitor of the first electrowetting element 64, for example a first plate of the storage capacitor Cs described with reference to FIG. 3. The electrically conductive plate 70 in this example is connected to a storage control line 79 for supplying a potential Vstorage to the electrically conductive plate 70. The storage control line 79 may be connected to a voltage generator or voltage source such as a display driver, for example the display driver for supplying the potential to the second electrode 19, or a timing and control printed circuit board. Vstorage may be different from or substantially the same as the potential applied to the second electrode 19. The electrically conductive plate 70 may be connected to other electrically conductive plates of other electrowetting elements by a storage line 81, which is for example an electrically conductive component such as a flexible foil. In this way, a common potential may be supplied from the storage control line 79 to a plurality of electrically conductive plates of storage capacitors of respective electrowetting elements, using the storage line 81. In other examples, the electrically conductive plate 70 need not be present.

A semiconducting channel 72, for example comprising amorphous silicon, is located over the row line 66 in FIGS. 4 and 5. The first electrowetting element 64 also includes a source line 74, which includes a portion considered to act as a source terminal 76 of the thin film transistor, and a drain layer 78, which includes a portion considered to act as a drain terminal 80 of the thin film transistor. The semiconducting channel 72 may, for example, be positioned between the source terminal 76 and the row line 66 and between the drain terminal 80 and the row line 66 and typically connects the source terminal 76 to the drain terminal 80. Thus, in the example of FIG. 4, the first electrowetting element 64 includes a thin film transistor (TFT) having a gate terminal 68, a source terminal 76 and a drain terminal 80. The drain, source and gate terminals may for example be formed of any of molybdenum (Mo), an alloy including molybdenum (Mo) and chromium (Cr), or aluminum (Al). There may be one or more layers between the layer including the row line 66 and the layer including the source line 74 and the drain layer 78, for example at least one layer of dielectric material such as silicon nitride or silicon dioxide. In this example, as described with reference to FIG. 5 below, there is a first insulating layer 67 between the layer including the row line 66 and the layer including the drain layer 78 (not shown in FIG. 4). In other examples, the first electrowetting element may not include the thin film transistor. The first electrowetting element may instead include a different switching element such as a diode.

Figure 6:
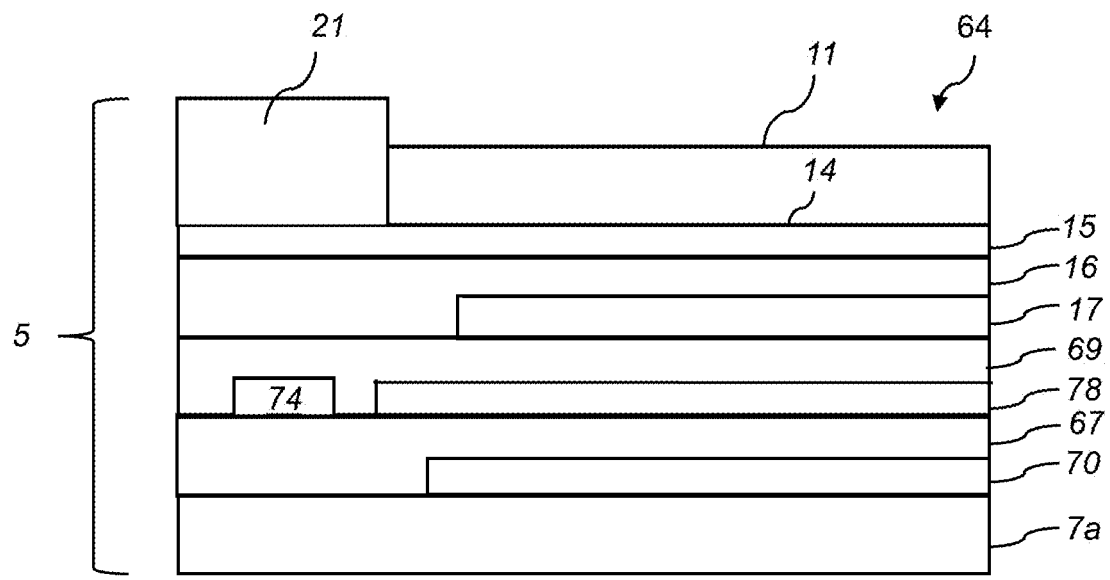
FIG. 6 shows schematically a cross-section of part of the example electrowetting element of FIG. 4 along the line B-B' of FIG. 4.

The first electrowetting element 64 in FIGS. 4 and 5 also includes a first electrode 17, which is similar to the first electrode 17 described above with reference to FIG. 1. The first electrode 17 is connected to the drain terminal 80 of the thin film transistor so that a potential can be applied to the first electrode 17 using the thin film transistor, using the row and column lines 66, 74. In the example of FIGS. 4 to 6, the first electrowetting element 64 includes a second insulating layer 69 between the drain layer 78 and the first electrode 17 (not shown in FIG. 4, for clarity). The second insulating layer 69 may for example be formed of or include a dielectric material, for example an inorganic material such as silicon dioxide or silicon nitride. The drain layer 78 and the first electrode 17 are connected through a via 82, sometimes referred to as a contact hole, which is for example a substantially vertical electrical contact e.g. with an angle of within plus or minus 20 degrees from the vertical, through the second insulating layer 69, although in other examples, the thin film transistor or other switching element may be connected to the electrowetting element electrode with a different arrangement.

The first electrowetting element 64 also includes a third insulating layer (shown in FIG. 5 but not illustrated in FIG. 4, for clarity), which in this example includes the hydrophobic layer 15 and the dielectric layer 16 described above with reference to FIG. 1. The third insulating layer is, for example, located on or to cover the layer including the first electrode, although there may be at least one layer between the first electrode and the third insulating layer. A portion of the first fluid 11 is in contact with a surface 14 of the hydrophobic layer 15 in the example of FIGS. 4 and 5. A wall 21, such as the wall 21 described with reference to FIG. 1, is located on the hydrophobic layer 15. In examples, the first electrowetting element 64 includes a wall positioned along each side of the first electrowetting element 64, for example such that the wall aligns or overlaps with a boundary surrounding the first electrowetting element 64. FIG. 4 illustrates a wall 21 positioned along a left side of the first electrowetting element 64 and FIG. 5 illustrates a wall 21 positioned along a top side of the first electrowetting element 64. The wall 21 of FIG. 4 is not shown in FIG. 5 and vice versa, for clarity. It is to be appreciated that the first electrowetting element 64 may include other walls not illustrated in FIGS. 4 and 5, for example walls 21 along each side of the first electrowetting element 64, as noted above. In other examples, the wall 21 may be considered a continuous wall positioned along one, some or all sides of the first electrowetting element. In examples, at least one of the walls of electrowetting elements of the array of electrowetting elements, such as first electrowetting elements, may partly or fully overlap with at least a portion of a row line or a column line, in either or both of a lateral and longitudinal direction. FIGS. 4 and 5 show such an example. In FIGS. 4 and 5, each of the column line 74 and the row line 66 are completely overlapped in cross-section and at least partly in length by a respective wall 21 (as shown in FIGS. 4 and 5 respectively). The first electrowetting element 64 further includes the second fluid 12 (not shown in FIGS. 4 and 5).

FIG. 6 shows schematically a cross-section of part of the electrowetting element 64 taken along dashed line B-B' shown in FIG. 4. In this cross-section, the source line 74 is illustrated, which is overlapped by a wall 21. Various parts are labelled with the reference numerals of features described above and corresponding descriptions should be taken to apply.

Figure 7:
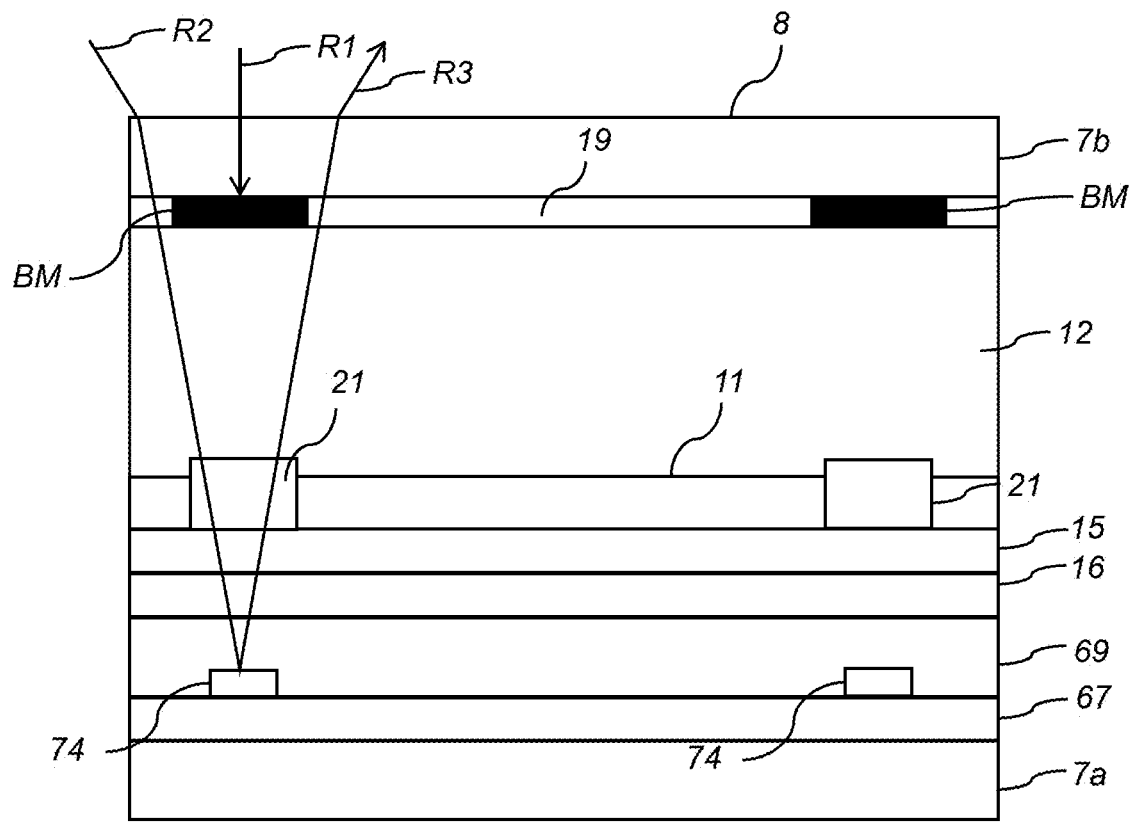
FIG. 7 shows schematically reflection of light in an electrowetting element.

FIG. 7 shows schematically how light may be undesirably reflected within the first support plate. Various features of the electrowetting element 2 described earlier with FIGS. 1 and 4 to 6 are shown schematically in FIG. 7 and labelled with the same reference numerals. Corresponding descriptions should be taken to apply here too. Several features, for example the first electrode, are not illustrated for clarity purposes.

As explained above, the black matrix BM can absorb and therefore block an incoming light ray R1 from passing through a wall 21. However, a light ray R2 with an appropriate angle may still enter the first support plate through the wall 21, without meeting the black matrix BM. Although in theory the black matrix BM could be enlarged to absorb such light rays, this would reduce a viewable display area of an electrowetting element which may be undesirable.

Once the light ray R2 has entered the first support plate, it may be reflected by a reflective surface within the first support plate, such as by the metallic source line 74. Other metallic structures such as a gate line or a source terminal or drain terminal may also reflect such incoming light rays. Such a reflector may be referred to as a reflective element in examples described herein. The light ray R2 is reflected back out of the first support plate, via the wall 21. In some instances, the reflected light ray R2 may meet the black matrix BM and be absorbed. However, in other instances, the reflected light ray R2 is a light ray R3 with a path which passes to the side of the black matrix BM, meaning a viewer would see this reflected light ray, which in turn can negatively affect the contrast of an image displayed by the display device.

Examples will now be described which address this problem, with reference to FIGS. 8, 9 and 10. Each of these Figures shows schematically a cross-section of an electrowetting element described previously, and is similar to FIG. 7. Hence, where appropriate, features are labelled with the same reference numerals as used earlier; corresponding descriptions apply also. Similar as for FIG. 7, some features are however not shown for clarity purposes.

In the examples to be described the at least one wall of the electrowetting element is transmissive to light of a first wavelength, and in some examples to substantially all parts, for example wavelengths, of light in the visible spectrum. Thus, light of the first wavelength can pass through the wall rather than being absorbed or blocked. This property of the wall is due to the material from which the wall is made, for example SUB.

As described above, the first support plate comprises the at least one wall in some examples, whereas in other examples the at least one wall may be formed as part of the second support plate and may span a distance between the first and second support plates. In other examples, the at least one wall may be formed separately from either the first or the second support plates.

In such examples, the first support plate comprises an absorbent layer absorbent to light of the first wavelength, and in some examples to substantially all parts of light in the visible spectrum. The absorbent layer for example comprises, and may be formed of, a photoresist material with light absorbing particles such as carbon black or neutral density (ND) glass for example neutral density filter glass available from Hoya Corporation USA, Optics Division, 680 N. McCarthy Blvd., Suite 120, Milpitas, Calif. 95035, USA. By being absorbent to the light of the first wavelength, the absorbent layer at least partly blocks passage of a light ray of the appropriate wavelength(s) by absorbing the light. The absorbent layer in examples is substantially non-reflective (within acceptable performance tolerances) and substantially non-transmissive (within acceptable performance tolerances) to light of the wavelength(s) which the absorbent layer is absorbent for.

In examples to be described the first support plate comprises a light redirector. The light redirector is configured, for example the positioning, size, shape and material of the redirector is such that light rays having entered the first support plate through the wall are received by the light redirector and redirected towards the absorbent layer. Such a light redirector typically has reflective properties to redirect, in other words change a direction of travel of, a light ray. However, the light redirector may also or instead use refraction, or other properties for changing a path of a light ray.

The light redirector is for example located between a first reflective element, such as a source line 74, and the wall. The light redirector is configured to redirect a light ray of a first wavelength, having passed from the wall, and received by the light redirector, towards the absorbent layer, and away from the first reflective element. The light ray is therefore absorbed by the absorbent layer rather than being reflected by the first reflective element.

It is to be appreciated that layers and other structures between the light redirector and the absorbent layer, along a path that light is redirected to the absorbent layer, are sufficiently transmissive to the light of the first wavelength (or the appropriate wavelengths).

In relevant examples, the positioning of the light redirector within the first support plate, both laterally and the level in the stack of layers making up the first support plate, is selectable in dependence on the particular electrowetting element construction, for example the width of wall, and the size and location of the absorbent layer, together with other design constraints such as where other structures (such as the source and drain terminals, and the first electrode) are located. For example, with a first reflective element such as the source line 74 located under a wall 21, for example overlapped by the wall, the light redirector may also be overlapped by the wall, between the first reflective element and the wall.

Similarly, the positioning and size of the absorbent layer within the first support plate, both laterally and the level in the stack of layers making up the first support plate is selectable, so that any light rays entering the first support plate can be absorbed, possibly having been redirected by the light redirector.

In some examples, the first support plate comprises a first reflective element, such as the source line 74, or another electrical conductor, and a second reflective element located between the wall and the first reflective element. The second reflective element may be considered the light redirector, and comprises a reflective surface angled to redirect a light ray of the first wavelength, having passed from the wall, and received by the light redirector, towards the absorbent layer, and away from the first reflective element. For example, the light redirector may be configured to redirect incoming light within a cone of +/−50 degrees, for example +/−45 degrees, with respect to the normal.

The light redirector is for example an electrical conductor having a reflective surface angled to redirect a light ray of the first wavelength, having passed from the wall, and received by the light redirector, towards the absorbent layer. The electrical conductor is for example any metallic or otherwise electrically conductive element, and may for example be the source line 74, row line 66 (which may otherwise be considered to be a gate line), or any other electrically conductive structure in the first support plate described herein, such as the gate terminal, the source terminal or the drain terminal. Hence, the electrical conductor may be connected to the gate terminal or to the source terminal of the thin film transistor. As described earlier with reference to FIG. 7, the source line 74 or indeed another metallic or electrically conductive element may be reflective to light having entered the first support plate through the wall. Hence, in examples with the electrical conductor having the reflective surface suitably angled, the reflectivity of the electrical conductor can be used to redirect light having passed from the wall, and received by the light redirector, towards the absorbent layer, rather than being undesirably reflected out through the wall. In this way the electrical conductor has a dual purpose: to perform its function in the circuitry to control the electrowetting element, for example as a source line, and also to redirect light towards the absorbent element.

The electrical conductor with the reflective surface may be overlapped by at least one of the walls, for example the source line 74 or the row line 66 as shown in FIG. 4.

Figure 8:
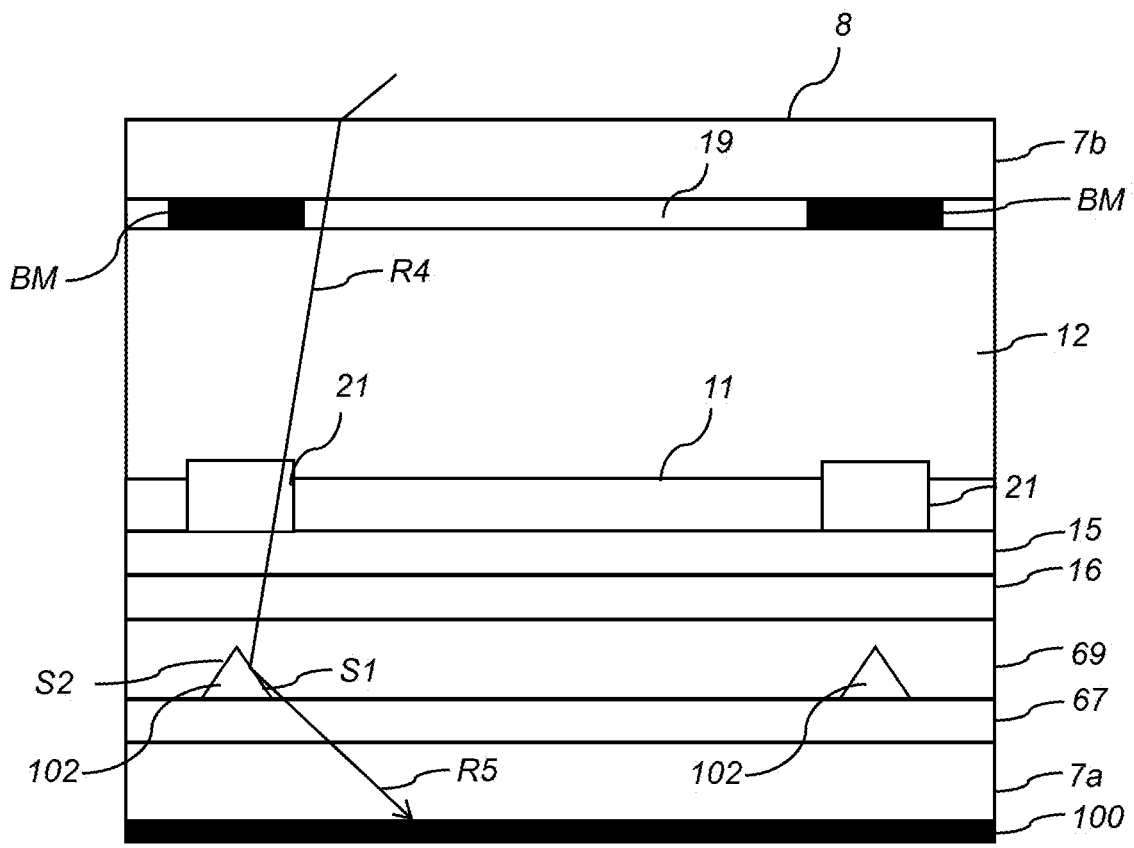
FIG. 8 shows schematically an electrowetting element according to examples.

FIG. 8 shows an example of such an electrical conductor with the reflective surface. More specifically, FIG. 8 shows an example of an electrical conductor 102, which is connected and performs similarly to the source line 74. However, the electrical conductor 102 is differently shaped from the source line 74, as it comprises a first reflective surface S1 angled to redirect a first light ray of the first wavelength, having passed from the wall, and received by the light redirector, towards the absorbent layer. The electrical conductor 102 comprises a second reflective surface S2 angled to redirect a second light ray of the first wavelength, having passed from the wall, towards the absorbent layer or to a separate absorbent layer.

In FIG. 8, the absorbent layer 100 is a coating or layer on a surface of the substrate 7*a*. Such an implementation of the absorbent layer is envisaged for other examples described herein, either as a continuous coating on the surface of the substrate, or alternatively as a coating or layer which covers only part of a surface the substrate. For example the absorbent layer may be applied to a surface of the substrate further from the fluids than an opposite surface on which are stacked various other layers, such as the first electrode, of the first support plate.

The electrical conductor is for example a longitudinal element, which for example runs along a line underneath a wall, such as the line taken by the source line 74 or row line 66. Hence, the first and second reflective surfaces may each be longitudinal too along the length of the line taken by the source or row lines.

The first and second reflective surfaces may be planar and angled relative to each other by an interior angle of for example 45 degrees. In other examples this angle may be greater, to give a steeper surface, or less. The first reflective surface and the second reflective surface may have a longitudinal edge in common and may diverge from each other in a direction away from the longitudinal edge. Hence, for example, a cross-sectional shape of the electrical conductor may be generally triangular, for example triangular, with three planar sides, within acceptable manufacturing and/or functional tolerances.

FIG. 8 illustrates a light ray R4 passing through the wall 21 and being reflected by the first reflective surface S1 and on as the reflected light ray R5 to the absorbent layer 100. The second reflective surface S2 may similarly reflect a second light ray towards the absorbent layer.

Figure 9:
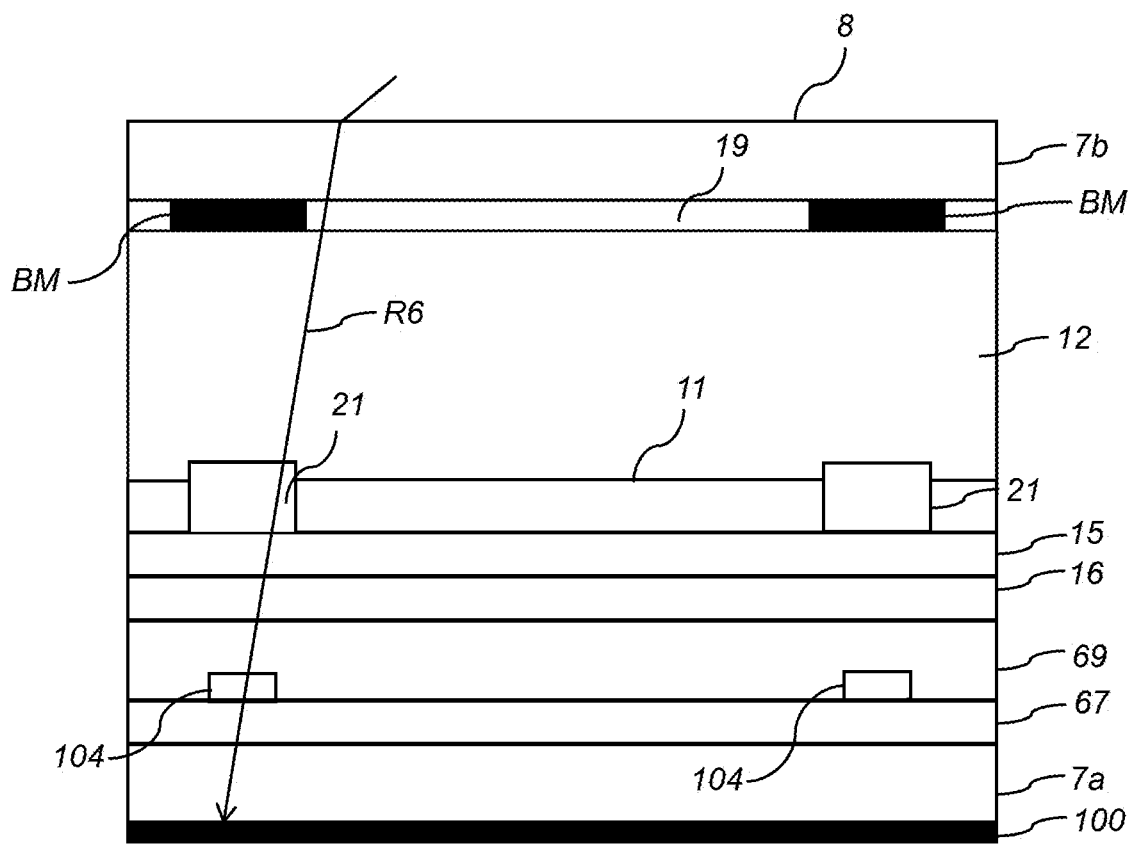
FIG. 9 shows schematically an electrowetting element according to different examples.

FIG. 9 illustrates alternative examples. The absorbent layer 100 is as described for FIG. 8 as are other features labelled with the same reference numerals. An electrowetting element according to these examples comprises an electrical conductor 104 which for example functions as a source line or row line described previously in respect of controlling the electrowetting element (although such an electrical conductor could in other examples be a different electrically conductive part of the first support plate). Hence the electrical conductor may be connected to a gate terminal or a source terminal of a thin film transistor. The electrical conductor in these examples is transmissive to light of the first wavelength (or indeed to the appropriate wavelengths transmitted by the wall and wanting to be absorbed by the absorbent layer, for example substantially all parts of the visible spectrum). Hence the electrical conductor comprises, and is for example formed of, a suitably electrically conductive and light transmissive material such as ITO. The thickness of such an electrical conductor of ITO may for example be thicker than the thickness of such an electrical conductor formed for example of molybdenum, due to the difference in sheet resistance. For example, such an ITO electrical conductor may have a thickness of approximately 50 times that of a molybdenum electrical conductor, so as to have for example a thickness of 12.5 micrometers. Such an electrical conductor may be overlapped by the wall and may also overlap the absorbent material. Hence, as illustrated in FIG. 9, a light ray R6 having passed through the wall may be transmitted through the electrical conductor and onto the absorbent layer 100. Such examples do not necessarily therefore have a light redirector like other examples, but still reduce or prevent undesirable reflections of light out through the wall(s). It is to be noted that FIG. 9 is schematic and that any refractive effects caused by the light being transmitted between layers of different materials in the first support plate may be accounted for.

In examples described above, the absorbent layer is located further from the fluids than the first reflective element, for example an electrical conductor such as a source line or the row line described with reference to FIGS. 4 to 6. In other examples, the first support plate comprises such an electrical conductor which may be overlapped by the wall and with the absorbent layer instead located between the wall and the electrical conductor. For example, the absorbent layer may be in contact with the electrical conductor, for example as a layer or coating on the electrical conductor. In such examples the absorbent layer may comprise or be formed of any appropriate material for absorbing light of the appropriate wavelengths. In some examples, the electrical conductor is formed of chromium (Cr) and the absorbent layer in contact with the electrical conductor is formed of chromium oxide (CrO). This CrO/Cr stack acts as an anti-reflective structure, due to the high refractive index of the CrO and the sufficiently large difference with the refractive index of the Cr electrical conductor. The extent of anti-reflectance/reflectance can be tuned by adjusting the thickness of each of the CrO and Cr layers, and/or by adding further layers on the CrO layer. In other examples, instead of CrO as the absorbent layer on Cr as the electrical conductor, molybdenum oxide (MoO) as the absorbent layer on molybdenum (Mo) as the electrical conductor may be used, with MoO having a refractive index for example being greater than 2.5 in the visible light spectrum. With the electrical conductor comprising Mo, it is to be appreciated that in some examples the electrical conductor may be at least partly formed of Mo. So, in some examples, the electrical conductor may be completely formed of Mo, but in other examples may be formed of a metal alloy which is partly Mo, for example an alloy comprising 95% Mo and 5% Cr.

Figure 10:
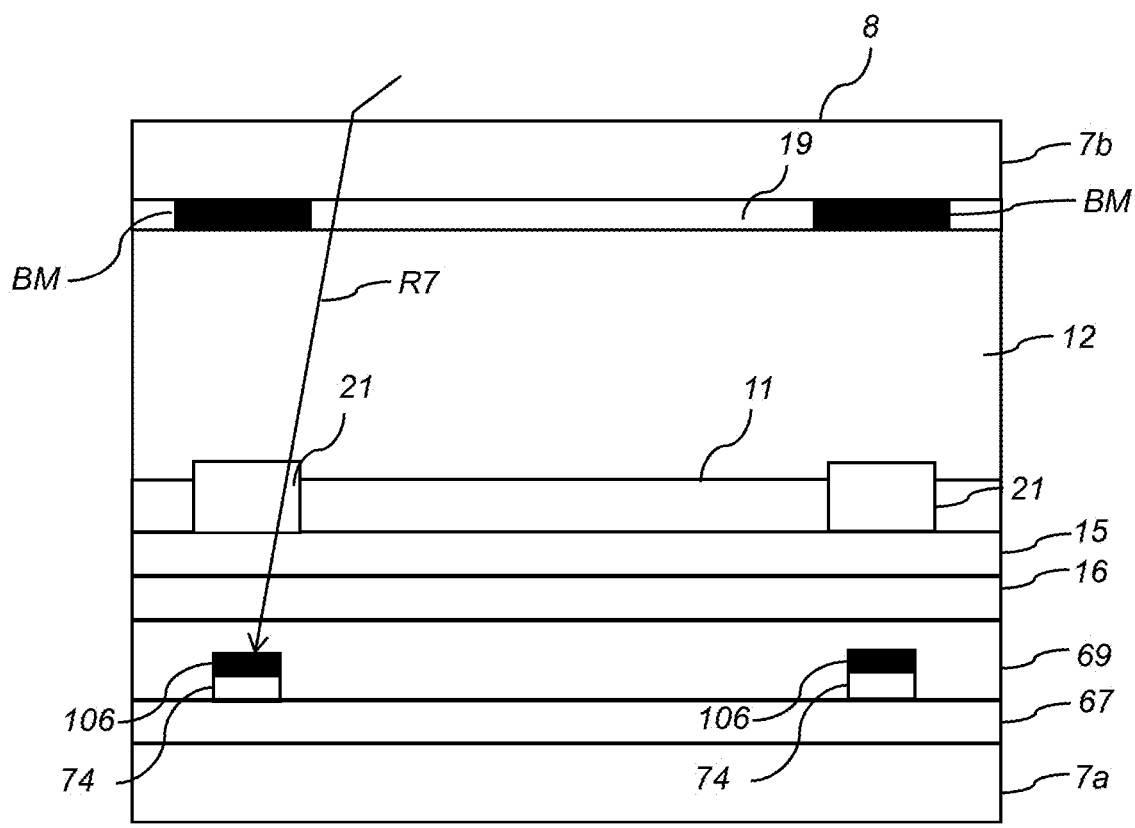
FIG. 10 shows schematically an electrowetting element according to further examples.

FIG. 10 illustrates such an example in which the electrical conductor 74 (formed of for example Cr) and the CrO layer 106 may be considered to act together as the absorbent layer. A light ray R7 is shown passing through the wall 21 and being absorbed by the CrO layer in combination with the Cr layer. In some further examples, it is envisaged that the electrical conductor comprises, for example is formed of, an electrically conductive material which also absorbs light of the appropriate wavelength(s) without the separate high refractive index layer. Such a material may comprise for example a dispersion of carbon black or carbon nano-tubes.

An electrowetting element of examples described herein may be fabricated using known methods to the skilled person. For example, electrodes and other electrical conductors such as source and row lines may be deposited or provided using for example a physical vapor deposition (PVD) technique such as sputtering, with an appropriate mask. Such techniques may be used also to form a light redirector described herein. Where such a light redirector has one or more reflective surfaces, an angle of a plane of the reflective surface may be obtained using an appropriate etching or photolithography technique. For example, to obtain the desired cross-sectional profile with appropriately angled reflective surfaces, an appropriate shadow mask may be used during a photolithography technique. Or, an appropriate etching technique may be used. For example, by alternating between an isotropic etching step and an anisotropic etching step, a stepped profile approximating the desired angle may be formed. Alternatively an etching technique may be used which etches a photoresist mask laterally together with etching an underlying metallic layer downwards; this creates an angled surface in the metallic layer. Or, a sacrificial layer may be used between the metallic layer to be etched and a photoresist mask, with the sacrificial layer having a higher etching rate than the metallic layer; as the sacrificial layer etches quicker than the metallic layer, an opening forms above the metallic layer and under the photoresist, which causes the metallic layer to be etched with an angled surface. Such techniques would be readily appreciated by the skilled person Where the absorbent layer is of an inorganic material, it may be deposited using for example sputtering on for example a metal, followed by an appropriate etching and/or photolithography process. Where the absorbent layer is an organic material, such as a photo-resist, it may be applied and patterned using a photolithography process.

Dielectric layers may be provided using Chemical Vapor Deposition (CVD) or Physical Vapor Deposition (PVD) for example sputter deposition or electron beam evaporation where temperature, pressure and power are controlled appropriately, as would be understood by the skilled person. The hydrophobic layer may then be provided, for example by a wet coating process such as slit coating, flexoprinting, spin coating or dip coating as is well known in the art. A layer of wall material may be provided on the hydrophobic layer, for example using a slot die coating or a spincoating process, and then patterned using a lithographic process to form the wall(s). The wall material may comprise an organic and/or a photoresist material, such as SU8.

The second support plate may be manufactured similarly to the first support plate, for example, by providing the second electrode on the substrate 7b for example using a physical vapor deposition (PVD) technique such as sputtering, with an appropriate mask.

The first fluid and the second fluid are introduced between the first support plate and the second support plate, for example using any suitable method. A seal may be arranged between the first support plate and the second support plate, with the seal surrounding the array of electrowetting elements for example. As will be appreciated by the skilled person, the seal may be applied as a fluid and subsequently hardened, for example by curing using ultraviolet light. The seal may be cured after the seal is brought into contact with both the first and second support plates and may be cured after the first and second fluids are introduced between the support plates.

Figure 11:
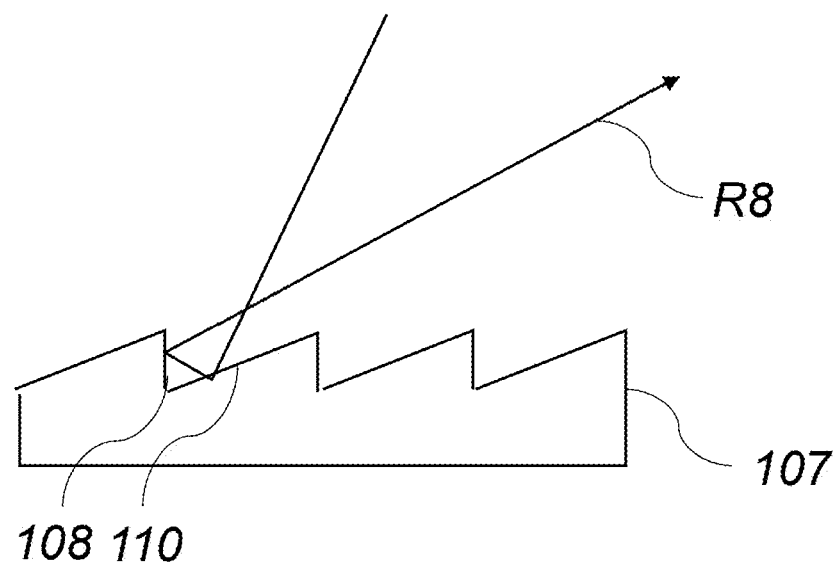
FIG. 11 and FIG. 12 shows schematically a reflective structure according to further examples.

FIG. 11 shows an alternative light redirector 107 according to further examples and compared with those described above. Such a light redirector may be in cross-section as shown in FIG. 11, or differently configured, to receive a light ray of a given wavelength received from a wall, having been transmitted through the wall, and to redirect the light ray back out of the first support plate. In such examples therefore there may not be an absorbent layer as described in other examples. Instead, the light redirector is configured to redirect at least one light ray back out of the first support plate with a sufficiently shallow angle such that when incident on a surface of the second support plate in contact with the second fluid, the light ray is redirected, for example reflected, by that surface of the second support plate, back towards the first support plate. Hence, the light ray may be totally internally reflected at least by the second support plate and possibly in turn further totally internally reflected by the first support plate, such as another light redirector.

The light redirector shown in FIG. 11 has for example a zig-zag or sawtooth profiled surface, for example as a series of longitudinal pairs of reflective surfaces 108, 110. One such reflective surface 108 may be approximately perpendicular (for example within acceptable manufacturing tolerances) to the display area. Another such reflective surface 110 with a common longitudinal edge with the reflective surface 110 may be appropriately angled (for example by an angle in the range 30 to 60 degrees) relative to the reflective surface 108 such that an incident light ray may be reflected in turn by the reflective surfaces 108, 110 to redirect the light ray R8 away from the first support plate and towards the second support plate, with an appropriate angle, to be totally internally reflected by the second support plate. The totally internally reflected light ray may be absorbed by the first fluid in due course, after at least one total internal reflection, or may continue to be totally internally reflected until exiting the display device via the second support plate.

Figure 12:
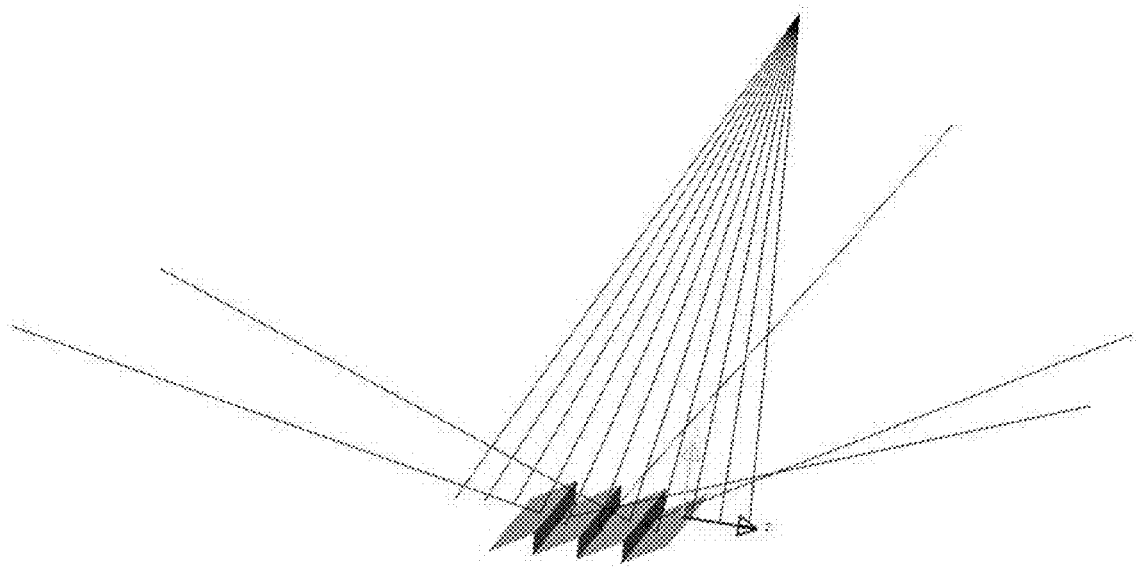

With a series of such pairs of reflective surfaces arranged side by side, with their longitudinal axes substantially parallel to each other, within acceptable manufacturing tolerances, such a light redirector can redirect incident light with a range of incident angles. This is schematically illustrated with FIG. 12 for a plurality of incident light rays originating from and diverging from a single point. A portion of the light redirector may be overlapped by at least a portion of the wall.

Examples are envisaged in accordance with those described previously, for example with FIG. 8, but with the light redirector, for example the electrical conductor which may be connected to a source or drain terminal, instead configured in accordance with FIG. 11. Such a light redirector may be less deep in cross-sectional profile compared with that described using FIG. 8.

Figure 13:
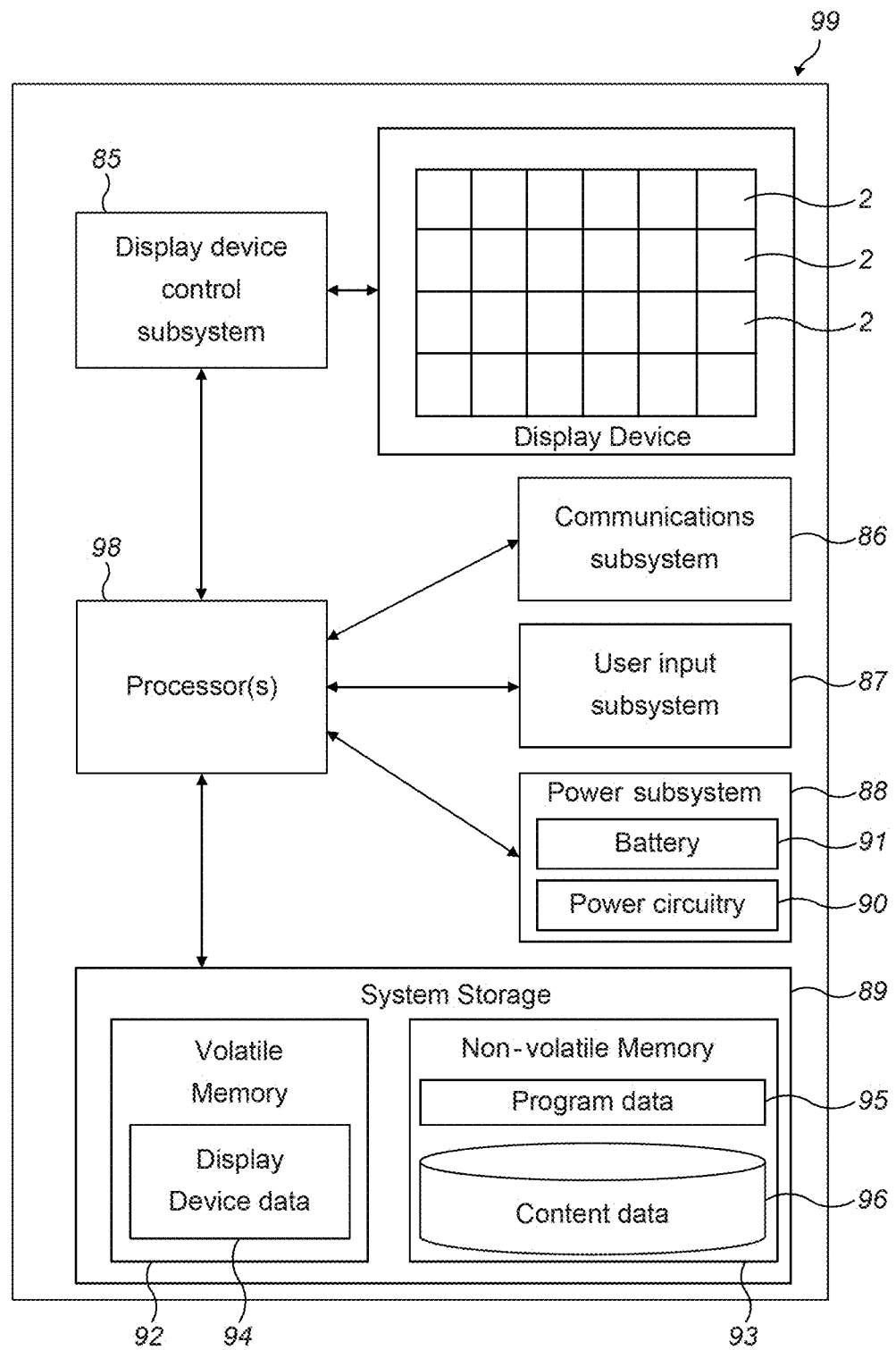
FIG. 13 shows a schematic system diagram of an example apparatus including an electrowetting display device.

FIG. 13 shows an example of apparatus which comprises a display device described above. The apparatus 99 is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance. The apparatus 99 may include a housing element (not shown) though other examples are envisaged without this housing element. The housing element is for example formed of molded plastic and may be an exterior piece of an e-reader housing. The housing element typically has a window, which is for example an aperture, opening, gap, optically transparent layer or other feature in the housing element through which at least light in the visible spectrum may be transmitted. The window is sized and shaped to in examples correspond with a size and shape of the display device, more specifically the array or matrix of electrowetting elements. Thus, a display effect output by the electrowetting elements is viewable through the window. In some examples, such as where the electrowetting elements operate by reflecting light for example from the surrounding environment of the display device, the window also permits ambient light to be transmitted through the window and onto the electrowetting elements. Hence the housing element acts for example as a frame for the array or matrix of electrowetting elements.

The apparatus 99 typically also includes at least one processor and at least one memory. A system diagram illustrating an example of a basic hardware architecture of the apparatus 99 is described in more detail now with reference to FIG. 13.

The apparatus 99 includes at least one processor 98 connected to and therefore in data communication with for example: a display device control subsystem 85, a communications subsystem 86, a user input subsystem 87, a power subsystem 88 and system storage 89. The display device control subsystem is connected to and is therefore in data communication with the electrowetting display device 1. The at least one processor 98 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, using one or more buses, to read information from or write information to one or more memories, for example those of the system storage 89. The at least one processor may additionally, or in the alternative, contain memory, such as processor registers.

The display device control subsystem 85 for example includes electrowetting element driver components, for use in applying a voltage to any of the electrowetting elements, to address different such electrowetting elements. In examples the electrowetting elements are configured according to an active matrix configuration and the display device control subsystem is configured to control switching elements such as thin film transistors (TFTs) of the display device 1 using circuitry to control the electrowetting elements. The circuitry may include signal and control lines. For example, the display device control subsystem 85 may include display drivers such as display column drivers and display row drivers.

The communications subsystem 86 for example is configured for the apparatus to communicate with for example a computing device using a data network, for example a computer network such as the Internet, a local area network, a wide area network, a telecommunications network, a wired network, a wireless network, or some other type of network. The communications subsystem 86 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus using the communications subsystem.

The user input subsystem 87 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 88 for example includes power circuitry 90 for use in transferring and controlling power consumed by the apparatus. The power may be provided by a mains electricity supply or from a battery 91, using the power circuitry. The power circuitry may further be used for charging the battery from a mains electricity supply.

The system storage 89 includes at least one memory, for example at least one of volatile memory 92 and non-volatile memory 93 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a configuration of a portion of the first fluid of an electrowetting element of the array of electrowetting elements, for example to control a display effect provided by the electrowetting display device.

In the example of FIG. 13, the volatile memory 92 stores for example display device data 94 which is indicative of display effects to be provided by the display device 1. The processor 98 may transmit data, based on the display device data, to the display device control subsystem 85 which in turn outputs signals to the display device for applying voltages to the electrowetting elements, for providing display effects from the display device. The non-volatile memory 93 stores for example program data 95 and/or content data 96. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The above examples are to be understood as illustrative. Further examples are envisaged. Examples of an electrowetting element with one light redirector are described above. It is understood that each electrowetting element may have one or many such light redirectors in the first support plate, to redirect light rays towards an absorbent layer. Indeed, each electrowetting element of an array of electrowetting elements may have one or many such light redirectors.

The width of at least one wall of an electrowetting element, together with the dimensions of any of a reflective element, light redirector and/or absorbent layer of the first support plate, and of a black matrix of the second support plate, may be selected appropriately such that light rays within a range of incident angles not blocked by the black matrix BM are absorbed by the absorbent layer, with suitable redirection by a light redirector to the absorbent layer where appropriate. For example, a width of a portion of the black matrix may be substantially equal (within acceptable measuring tolerances) to or greater than a width of a wall overlapped by the black matrix (with each width being taken in a direction perpendicular a direction of separation between the first and second support plates). The width of the black matrix and wall may influence a range of angles of incident light which may pass through the wall and into the first support plate, together in some examples by a separation distance between the first and second support plates. For example, incident light in a range of +/−50 or 45 degrees relative to the normal may be considered suitably redirected to the absorbent layer. Another factor considered in the design of the electrowetting element is for example a spacing between the first and second support plates, which may be in the range of 5 to 50 micrometers.

It is to be noted that in examples described herein with a wall overlapping an electrical conductor, a portion of the electrical conductor may be overlapped by at least a portion of the wall. For example, a wall may overlap such an electrical conductor partly or entirely laterally, and the wall may overlap the electrical conductor at least partly along a longitudinal axis of the electrical conductor. In further examples, the electrical conductor may overlap at least a portion of the first layer.

In examples described above, a light redirector, for example a reflective surface, is configured to redirect and/or reflect a light ray of the first wavelength having been transmitted through the wall. It is to be appreciated that light for example of the first wavelength, for example light in the visible light spectrum, may enter the first support plate at different locations than a wall. For example, a thickness of a first fluid layer may be thinner next to a wall, or where the first fluid covers a raised portion of the hydrophobic layer, to the extent that light may pass through the thinner first fluid layer and into the first support plate. It is envisaged that a light redirector described previously may be configured also to redirect light received through such a thinner part of the first fluid layer towards the absorbent layer.

Further examples are envisaged, which include combinations of features of the originally filed claims, as indicated in the following table, which lists various envisaged claim dependencies for the claims originally filed with this application. Hence, in addition to the description above, this table gives basis in the specification for general examples having a combination of features of claims filed herewith:

| Claim as Originally Filed | Envisioned Claim Dependencies |
| --- | --- |
| 1 | — |
| 2 | 1 |
| 3 | 1 |
| 4 | 3 |
| 5 | 1 |
| 6 | 1 |
| 7 | 1 |
| 8 | 7 |
| 9 | 7, 8 |
| 10 | Any of claims 1 to 6 |
| 11 | — |
| 12 | 11 |
| 13 | 11, 12 |
| 14 | Any of claims 11 to 13 |
| 15 | Any of claims 11 to 14 |
| 16 | — |
| 17 | 16 |
| 18 | 16 |
| 19 | 16 |
| 20 | 16 |

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting element comprising:
 a first support plate comprising:
  an electrode;
  a light redirector comprising a reflective surface; and
  a first layer absorbent to light of a first wavelength;
 a second support plate;
 a first fluid in contact with the first support plate;
 a second fluid immiscible with the first fluid and in contact with the second support plate, the first fluid and the second fluid located between the first support plate and the second support plate; and
 a wall which at least partly surrounds an area of the first support plate in contact with the first fluid, the wall transmissive to light of the first wavelength, the reflective surface configured to receive a light ray of the first wavelength from the wall and redirect the light ray towards the first layer.

2. The electrowetting element of claim 1, the first support plate comprising:
 a first reflective element, the light redirector located between the wall and the first reflective element.

3. The electrowetting element of claim 1, wherein the light redirector is an electrical conductor, the reflective surface angled to receive the light ray of the first wavelength from the wall and redirect the light ray towards the first layer, wherein the electrical conductor is connected to a gate terminal or a source terminal of a thin film transistor.

4. The electrowetting element of claim 3, wherein at least a portion of the wall overlaps a portion of the electrical conductor.

5. The electrowetting element of claim 1, wherein the reflective surface is a first reflective surface, and the light redirector is an electrical conductor comprising:
the first reflective surface angled to receive the first light ray of the first wavelength from the wall and redirect the first light ray towards the first layer; and
a second reflective surface angled to receive a second light ray of the first wavelength from the wall and redirect the second light ray towards the first layer,
wherein the first reflective surface and the second reflective surface have a longitudinal edge in common and the first reflective surface diverges from the second reflective surface in a direction away from the longitudinal edge.

6. The electrowetting element of claim 1, the first support plate comprising a substrate layer at an underside of the first support plate, the first layer in contact with a surface of the substrate layer.

7. An apparatus comprising:
an electrowetting element comprising:
a first support plate comprising:
an electrode;
a light redirector comprising a reflective surface; and
a first layer absorbent to light of a first wavelength;
a second support plate;
a first fluid in contact with the first support plate;
a second fluid immiscible with the first fluid and in contact with the second support plate, the first fluid and the second fluid located between the first support plate and the second support plate;
a wall which at least partly surrounds an area of the first support plate in contact with the first fluid, the wall transmissive to light of a first wavelength, the reflective surface configured to receive a light ray of the first wavelength from the wall and redirect the light ray towards the first layer;
at least one processor; and
at least one memory comprising computer program instructions, the at least one memory and the computer program instructions operable to, with the at least one processor, control operation of the electrowetting element.

8. The apparatus of claim 7, wherein the light redirector is an electrical conductor, the reflective surface angled to receive the light ray of the first wavelength from the wall and redirect the light ray towards the first layer, wherein the electrical conductor is connected to a gate terminal or a source terminal of a thin film transistor.

9. The apparatus of claim 7, wherein the reflective surface is a first reflective surface, and the light redirector is an electrical conductor comprising:
the first reflective surface angled to receive the first light ray of the first wavelength from the wall and redirect the first light ray towards the first layer; and
a second reflective surface angled to receive a second light ray of the first wavelength from the wall and redirect the second light ray towards the first layer,
wherein the first reflective surface and the second reflective surface have a longitudinal edge in common and the first reflective surface diverges from the second reflective surface in a direction away from the longitudinal edge.

10. The electrowetting element of claim 1, the reflective surface angled to receive the light ray of the first wavelength from the wall and redirect the light ray towards the first layer.

11. The electrowetting element of claim 1, wherein the light redirector is an electrical conductor connected to a gate terminal or a source terminal of a thin film transistor.

12. The electrowetting element of claim 1, wherein the light redirector is an electrical conductor comprising the reflective surface angled to receive the light ray of the first wavelength from the wall and redirect the light ray towards the first layer, wherein a cross section of the electrical conductor is generally triangular.

13. The apparatus of claim 7, the reflective surface angled to receive the light ray of the first wavelength from the wall and redirect the light ray towards the first layer.

14. The apparatus of claim 7, wherein the light redirector is an electrical conductor connected to a gate terminal or a source terminal of a thin film transistor.

15. The apparatus of claim 7, wherein the light redirector is an electrical conductor comprising the reflective surface angled to receive the light ray of the first wavelength from the wall and redirect the light ray towards the first layer, wherein a cross section of the electrical conductor is generally triangular.

16. An electrowetting element comprising:
a first support plate comprising:
an electrode;
an electrical conductor, and
a first layer absorbent to light of a first wavelength;
a second support plate;
a first fluid in contact with the first support plate;
a second fluid immiscible with the first fluid and in contact with the second support plate, the first fluid and the second fluid located between the first support plate and the second support plate; and
a wall which at least partly surrounds an area of the first support plate in contact with the first fluid, the wall transmissive to light of the first wavelength, a portion of the electrical conductor overlapped by at least a portion of the wall, and the first layer located between the wall and the electrical conductor.

17. The electrowetting element of claim 16, the first layer in contact with the electrical conductor.

18. The electrowetting element of claim 16, the first layer comprising:
chromium oxide (CrO) and the electrical conductor comprising chromium (Cr); or
molybdenum oxide (MoO) and the electrical conductor comprising molybdenum (Mo).

19. The electrowetting element of claim 16, the electrical conductor comprising indium tin oxide and at least partly transmissive to light of the first wavelength, at least a portion of the first layer overlapped by the electrical conductor.

20. The electrowetting element of claim 16, wherein the electrical conductor is connected to a gate terminal or a source terminal of a thin film transistor.

* * * * *